Aug. 25, 1964 SHINTARO OSHIMA ETAL 3,146,354

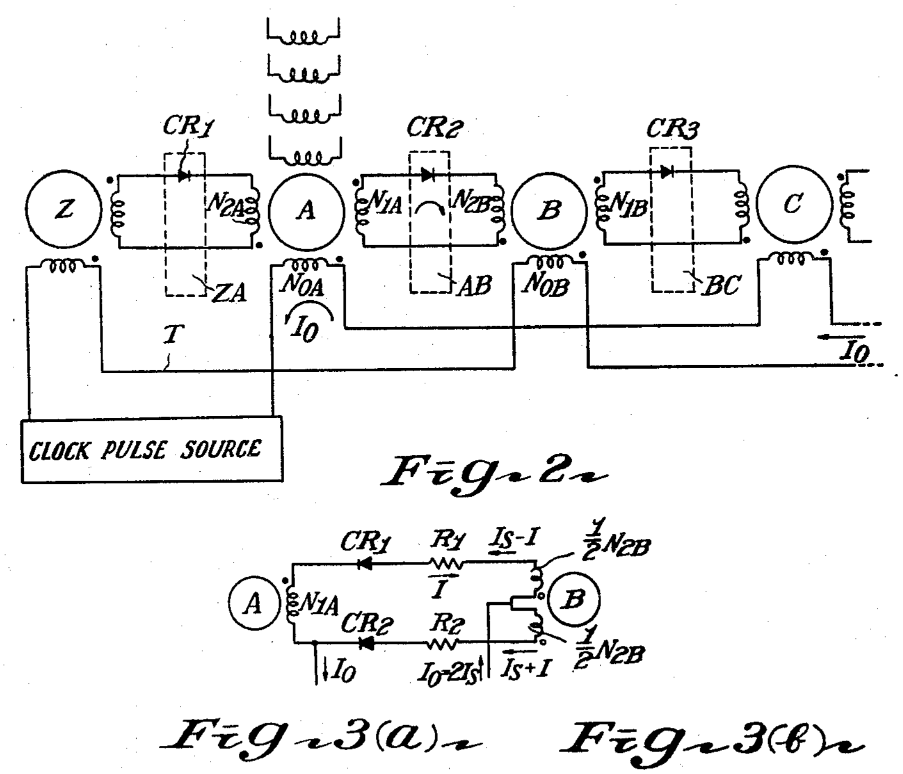
Fig. 1, Fig. 2
Fig. 3(a) Fig. 3(b)
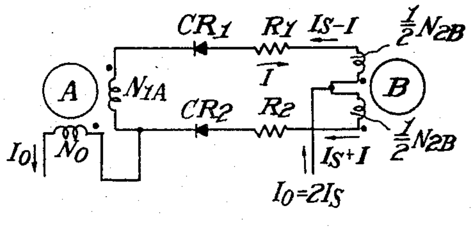
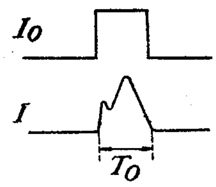

SYSTEM OF LOGICAL OPERATION INCLUDING MAGNETIC CORE CIRCUIT

Filed March 20, 1961 13 Sheets-Sheet 4

$$u = xyz + \bar{x}yz + x\bar{y}z + xy\bar{z}$$

$$u = x + y + z$$

3,146,354

SYSTEM OF LOGICAL OPERATION INCLUDING MAGNETIC CORE CIRCUIT

Shintaro Oshima, Tokyo-to, Hajime Enomoto, Ichikawa-shi, and Saburo Shirai and Yasuo Koseki, Tokyo-to, Japan, assignors to Kokusai Denshin Denwa Kabushiki Kaisha, Tokyo-to, Japan, a joint-stock company of Japan Filed Mar. 20, 1961, Ser. No. 96,805
Claims priority, application Japan Mar. 23, 1960
19 Claims. (Cl. 307—88)

The present invention relates to improvements in a system of logical operation including magnetic core circuits.

Hitherto, research has been made in the so-called magnetic pulse amplifier (this will be denoted as MPA in the following specification) consisting generally of a magnetic core having rectangular loop characteristics and one or two diodes. In magnetic pulse amplifiers generally a binary input signal is applied to a primary winding of the magnetic core, and an output reading pulse produced in a secondary winding of said core is transferred, in conjunction with a diode in a tertiary winding of said core, into another MPA.

In general, an MPA circuit is not particularly suited to high-speed operation, but is well suited to various data-processing applications, including electrical computation, communications, input-output control, and memory systems.

The most significant characteristic features of an MPA circuit are reliability and simplicity. In the conventional MPA circuit, each component used is either inherently reliable (particularly the magnetic core) or is reliable within the comfortable tolerance permitted in MPA design, and also is used in such a manner as to emphasize dependence on its most reliable characteristics. An MPA circuit is also inherently resistive against the interference caused by system noise because of the low impedance characteristic of an MPA circuit and the integrating effect of flux switching. Furthermore, power consumption is quite low in a system employing an MPA circuit.

In addition, MPA circuits are particularly suited to systems requiring operation in extremely adverse climates, and under extreme vibration and acceleration because of their low average power consumption and long trouble-free service in harsh environments.

The present invention relates to systems of logical operation, in which the above-mentioned MPA circuits are used.

An essential object of the present invention is to provide systems of logical operation which are very reliable and simpler than the conventional systems of logical operation.

The objects and other objects and advantages of this invention have been attained by a system of logical operation including magnetic core circuits, wherein two groups consisting of more than one logical circuit element are provided, each of said logical circuit elements comprising a pair of magnetic cores, a setting winding wound on said cores for the flowing therethrough of a setting pulse current to produce in said cores a sufficiently larger magnetic force than the coercive force of said cores, a writing bias winding wound on said cores for the flowing therethrough of a writing bias pulse current to produce in said cores a magnetic force corresponding to substantially the coercive force of said cores, an output winding wound on said cores for the flowing therethrough of a read-out pulse current of the necessary magnitude to carry out writing at the next stage, said winding having a gating means connected thereto in series, a constant input winding wound on said cores for the flowing therethrough of a constant input pulse current the amplitude of which is made an odd integer multiple of half of the amplitude of said reading pulse current, and at least one input winding wound on said cores, two coils forming each of said windings wound, respectively, on said magnetic cores of a pair being connected in series to form at their two ends, respectively, setting terminals, writing bias terminals, constant input terminals, at least one input terminal and output terminals; and a pulse current generating circuit is provided, said circuit comprising means for supplying the above-stated pulse currents and a synchronous means which applies said pulse currents in a sequence such that the writing bias pulse current of one group and the reading-out pulse current of the other group are produced at the same time and setting pulse current is produced next to the respective reading-out pulse current. The novel features of the present invention will be apparent from the following detailed description, when taken together with the accompanying drawings, in which the same and equivalent members are indicated by the same reference and in which:

FIG. 1 shows a schematic connection diagram of a conventional magnetic pulse amplifier ("Digital Application of Magnetic Devices," edited by A. J. Meyerhoff, John Wiley & Sons Inc., 1960, pages 101, FIG. 8.1);

FIG. 2 is a typical circuit of a magnetic pulse amplifier;

FIG. 3(*a*) is another typical circuit of a magnetic pulse amplifier;

FIG. 3(*b*) is a diagram for showing the period of the clock pulse current used in the circuit of FIG. 3(*a*);

Figure 4A:
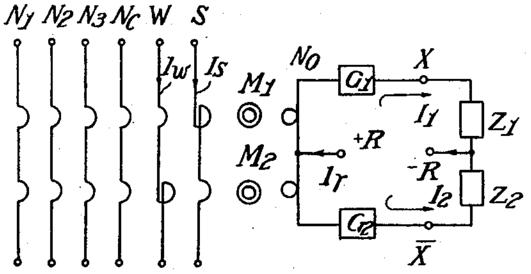
Figures 4B, 4C:
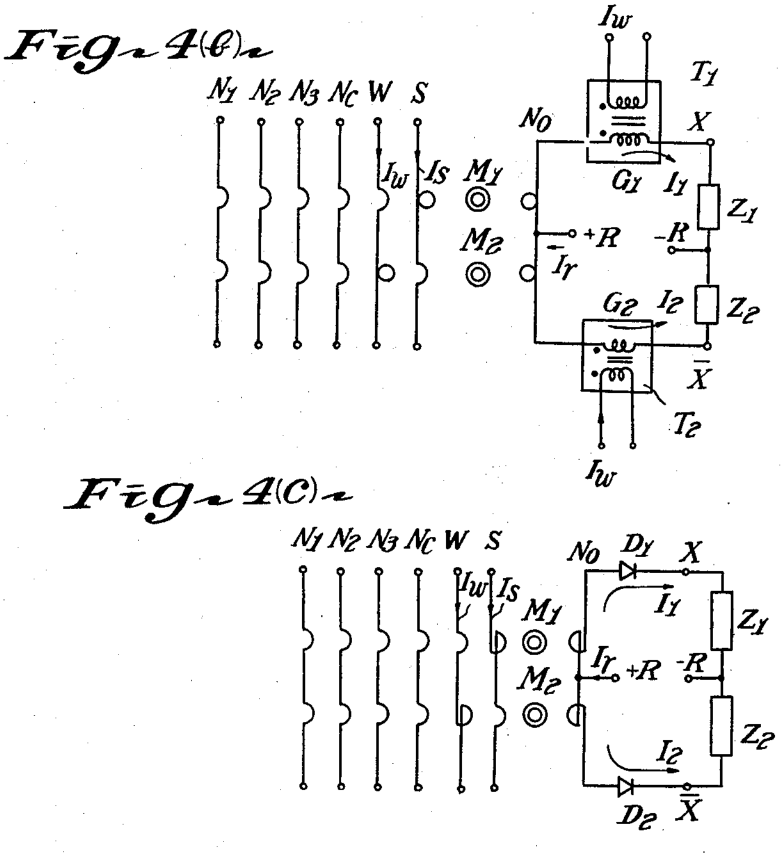
Figure 5A:
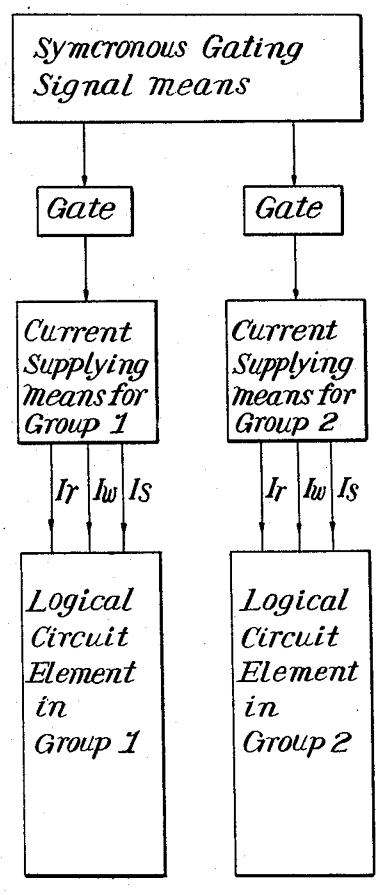
Figure 5B:
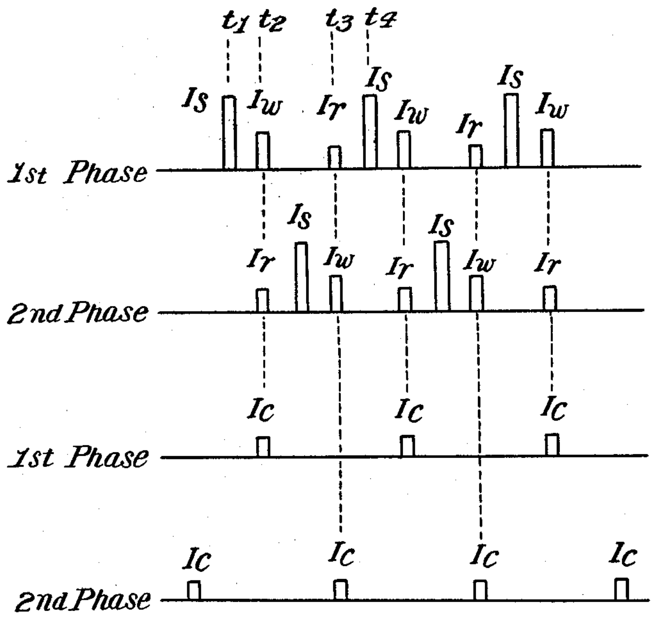
Figure 6:
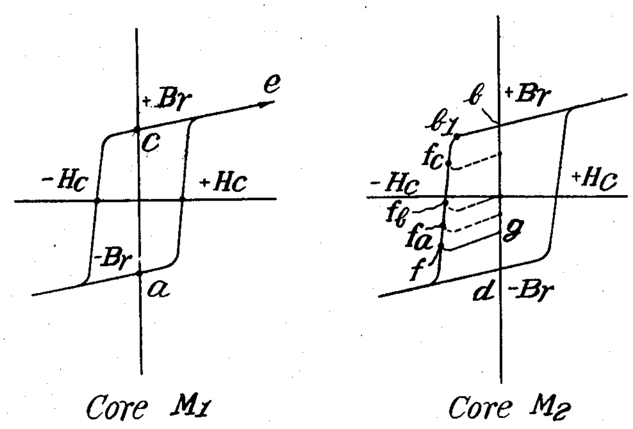
Figure 7:
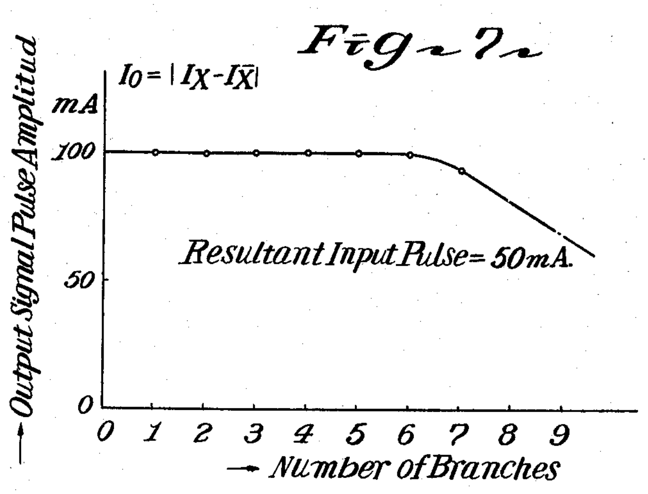
Figure 8:
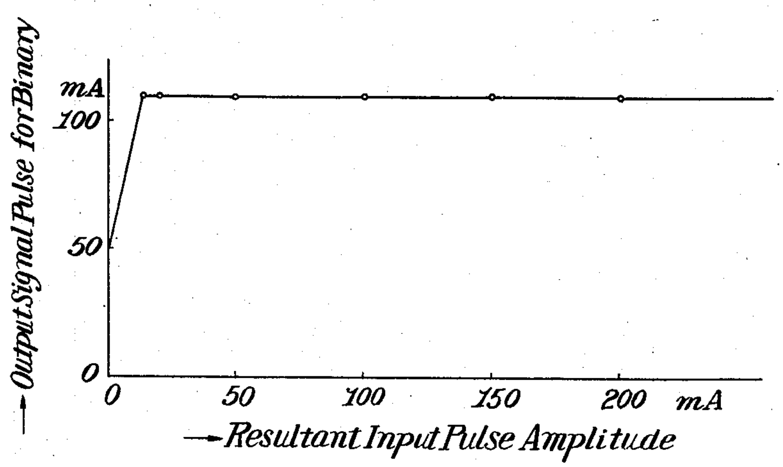
Figure 9:
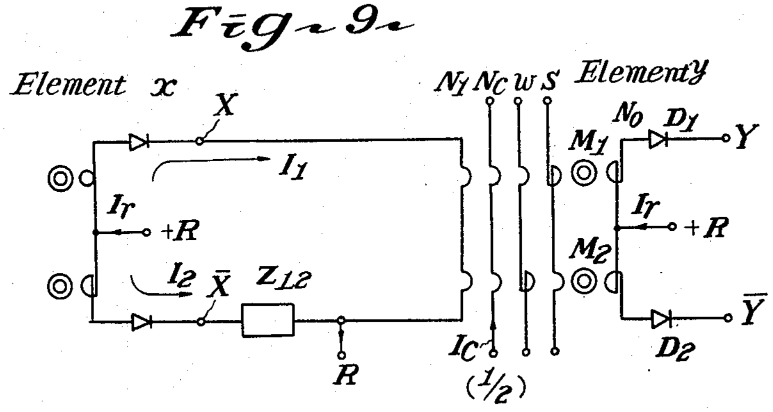
Figure 10:
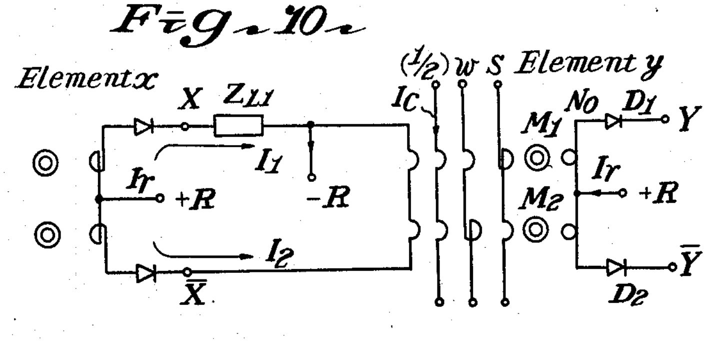
Figure 11:
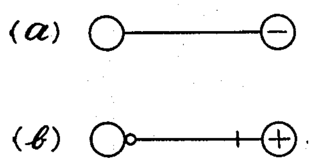
Figure 12:
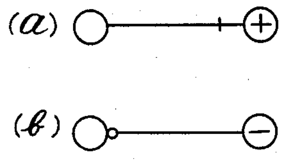
Figures 13, 14:
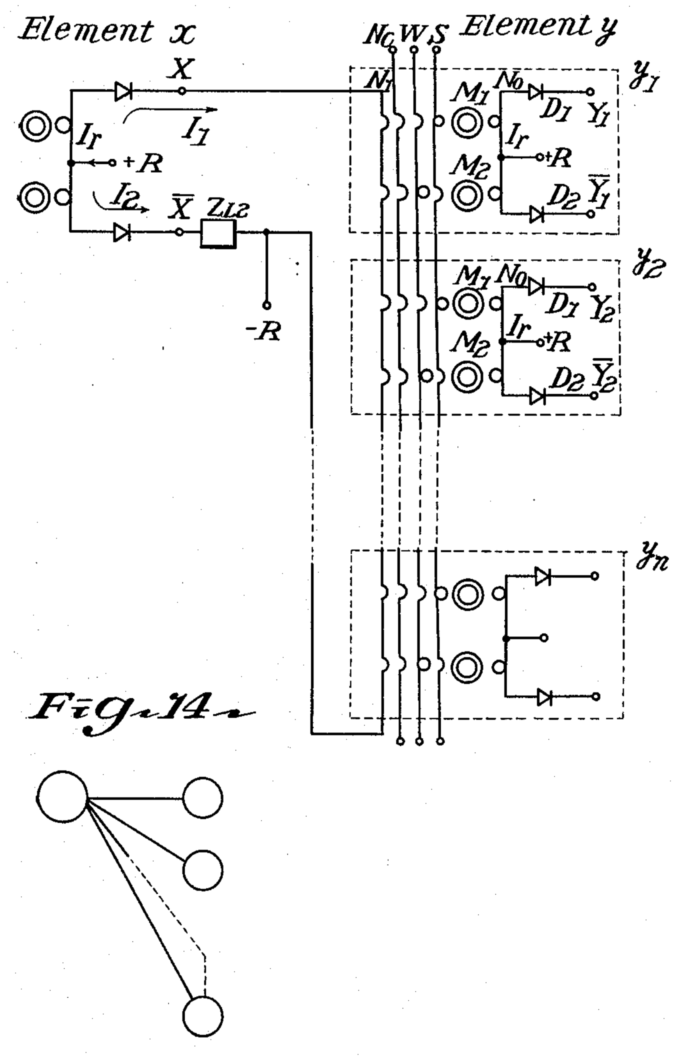
Figure 15A:
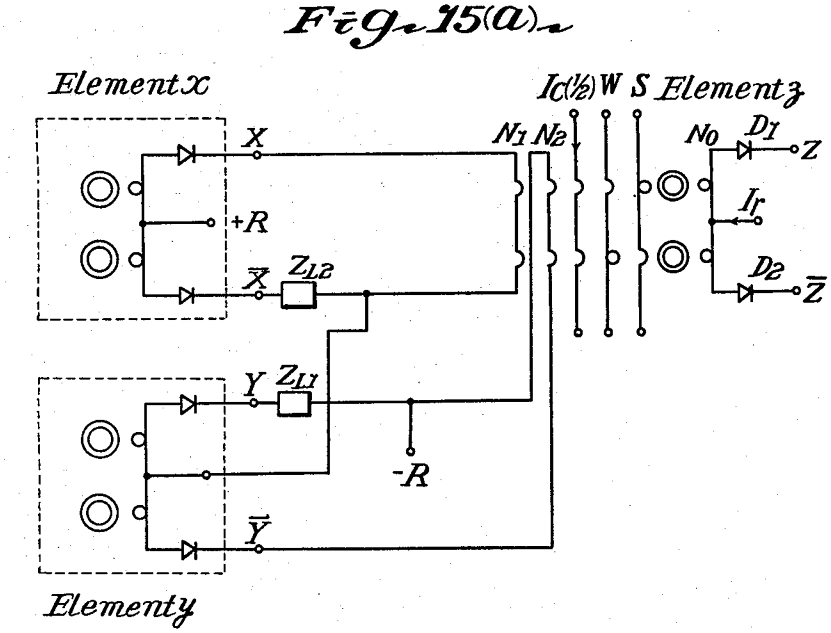
Figure 15B:
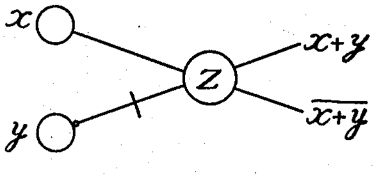
Figure 16:
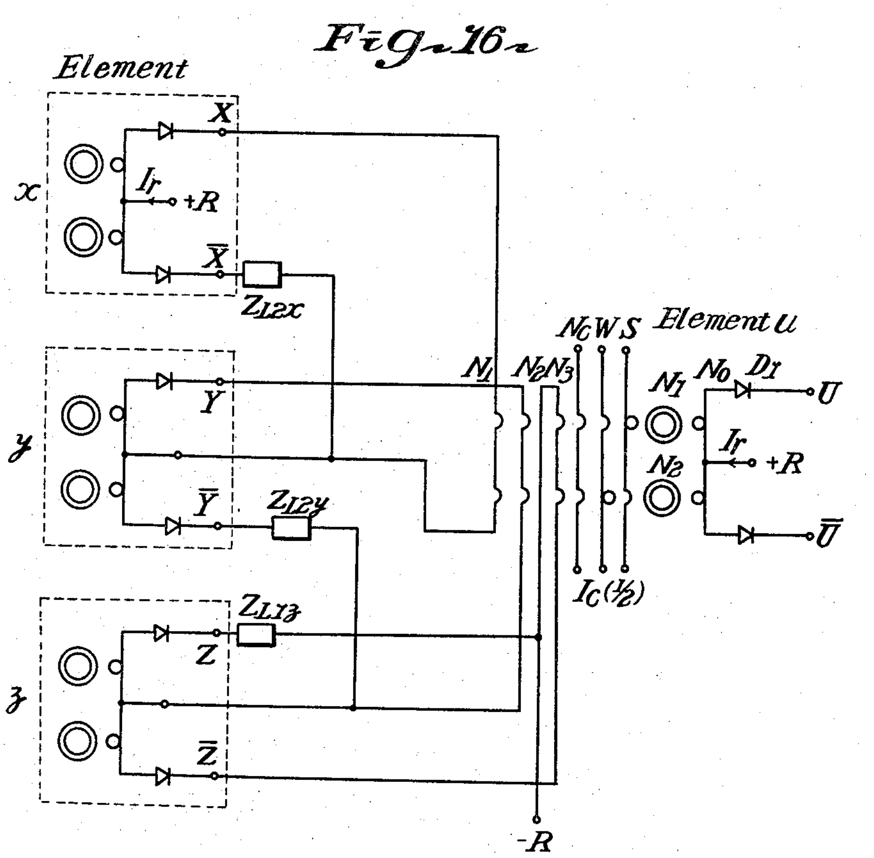
Figure 17A:
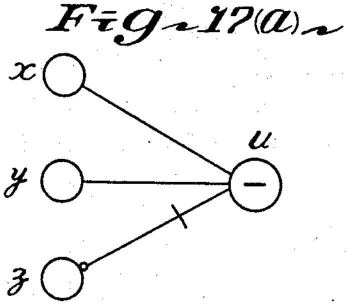
Figure 17B:
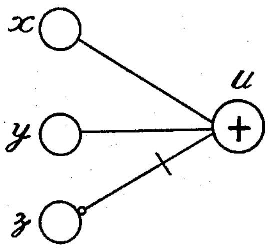
Figure 18:
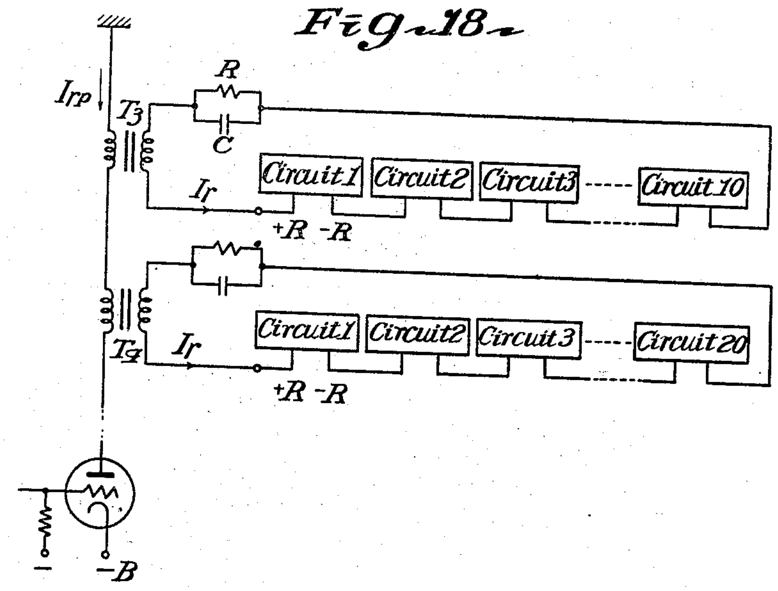
Figure 19:
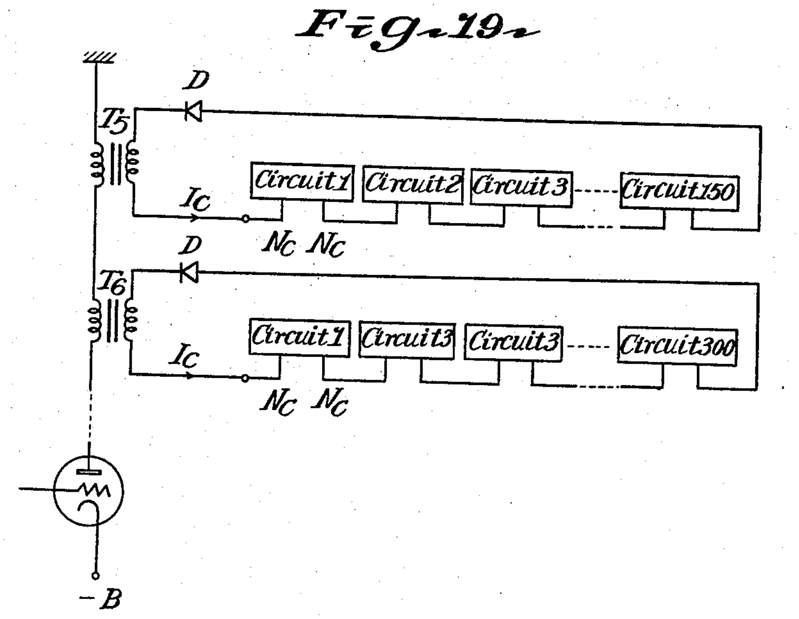
Figure 20A:
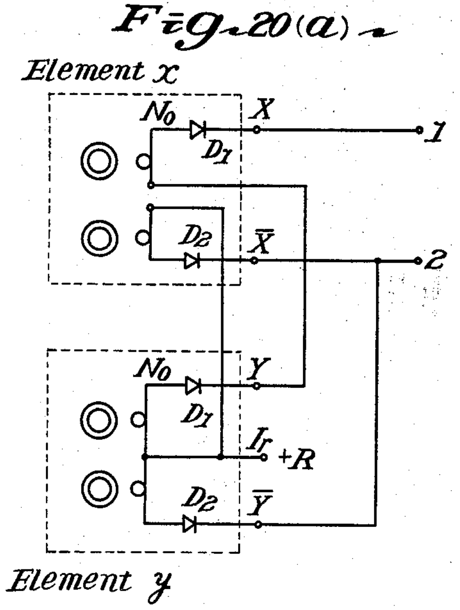
Figure 20B:
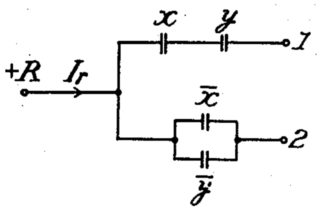
Figure 20C:
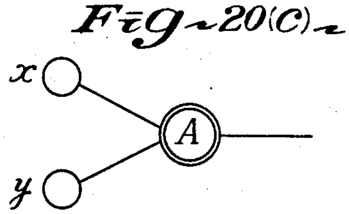
Figure 21:
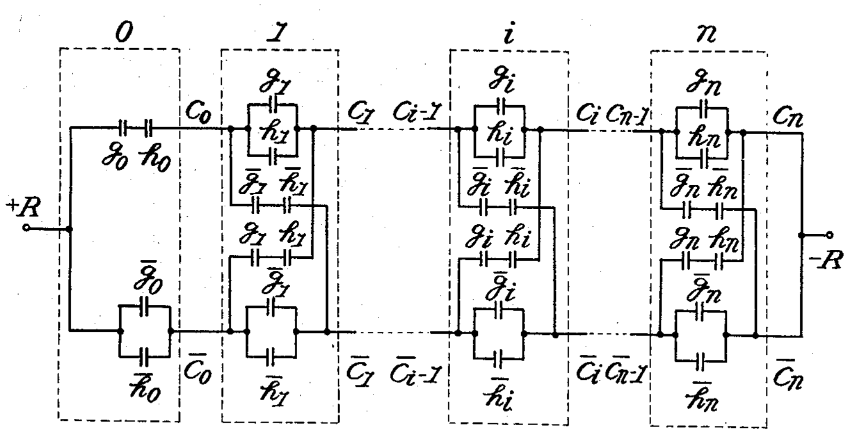
Figure 22:
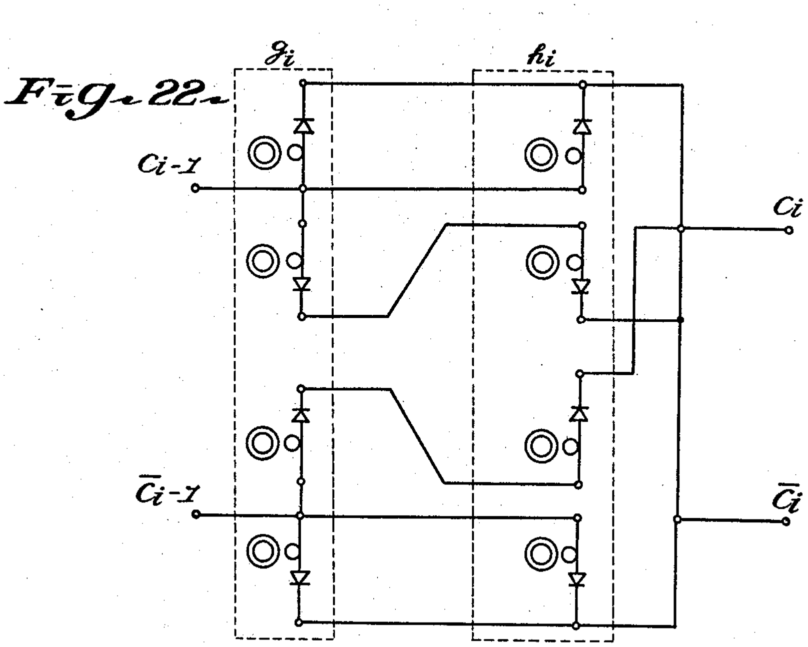
Figure 24:
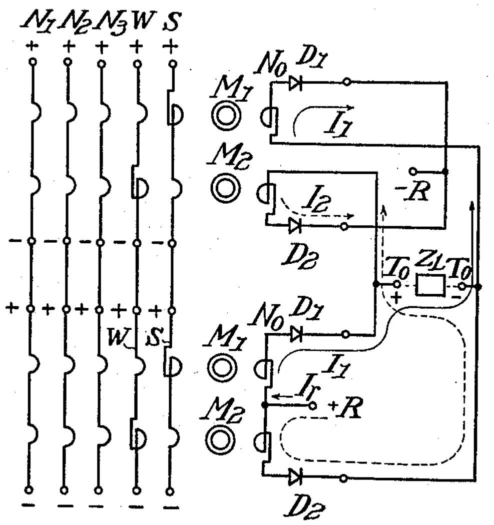
Figures 23A, 23B, 25:
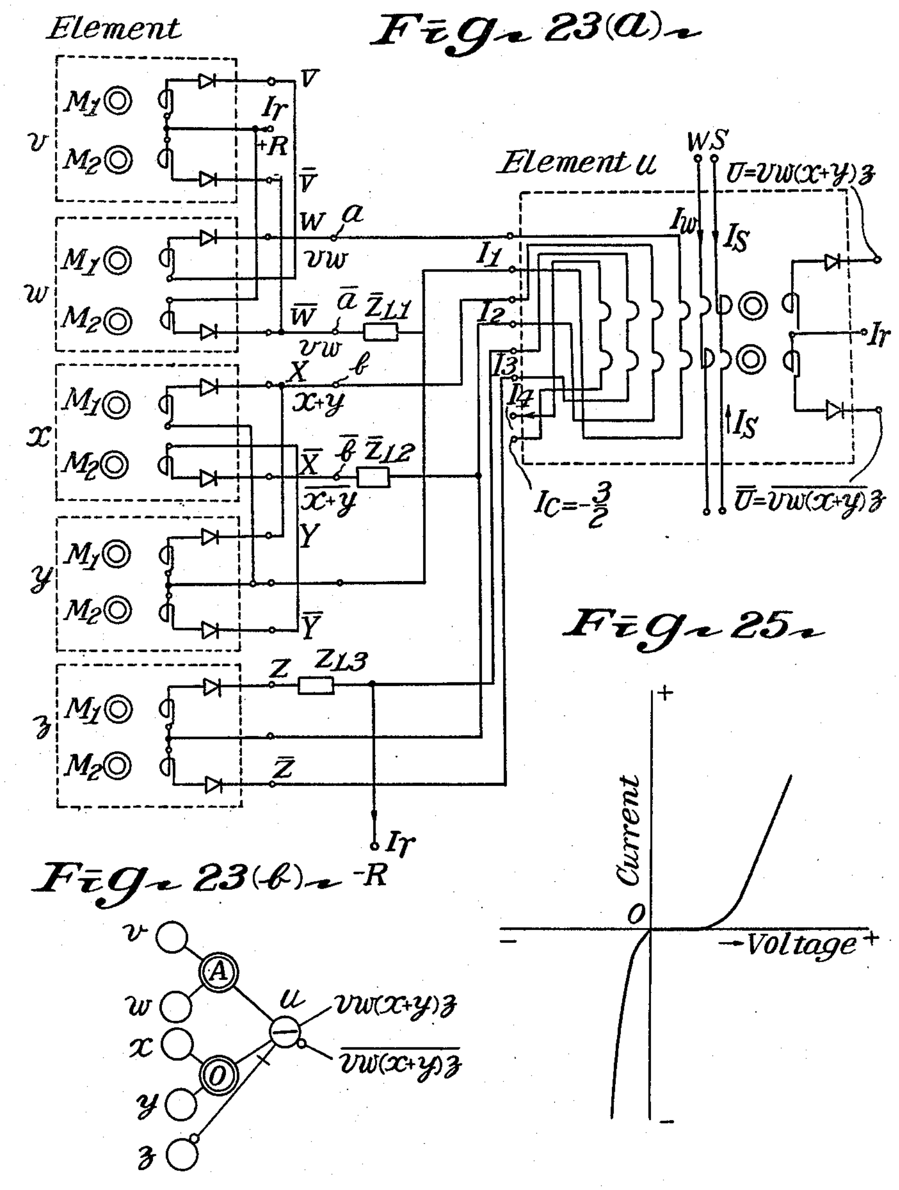

FIGS. 4(*a*), (*b*) and (*c*) are schematic connection diagrams of three examples of this invention;

FIG. 5(*a*) is a schematic diagram for constructing the circuit system of FIG. 4;

FIG. 5(*b*) is a diagram illustrating clock pulse trains to be used for embodying the circuit of this invention;

FIG. 6 is a diagram illustrating hysteresis loops of the magnetic core to be used in this invention, for showing variation of the state of said core;

FIG. 7 is an experimental graph for showing the relation between output signal pulse amplitude and number of branches;

FIG. 8 is a graph for showing the relation between output signal and resultant input pulse amplitude;

FIGS. 9 and 10 are schematic connection diagrams of two different examples of this invention;

FIGS. 11(*a*) and (*b*) are symbolic diagrams representing the circuit of FIGS. 9 and 10;

FIGS. 12(*a*) and (*b*) are symbolic diagrams of other circuits corresponding to those in FIG. 11, but relating to "Not" circuit;

FIG. 13 is a schematic connection diagram of another example of this invention;

FIG. 14 is a symbolic diagram representing the circuit of FIG. 13;

FIG. 15(*a*) is a schematic connection diagram for showing another example of this invention;

FIG. 15(*b*) is a symbolic diagram representing the circuit of FIG. 15(*a*);

FIG. 16 is a schematic connection diagram for showing still another example of this invention;

FIG. 17(*a*) is a symbolic diagram representing the circuit of FIG. 16;

FIG. 17(*b*) is a symbolic diagram representing a circuit corresponding to improvement of the circuit in FIG. 16;

FIGS. 18, 19 and 20(*a*) are, respectively, three different examples of this invention;

FIG. 20(*b*) is a relay system diagram representing the circuit of FIG. 20(*a*);

FIG. 20(*c*) is a symbolic diagram representing the circuit of FIG. 20(*a*);

FIG. 21 is a relay system diagram representing another example of this invention;

FIGS. 22, 23(*a*) and 24 are three further different examples of this invention;

FIG. 23(*b*) is a symbolic diagram representing the circuit of FIG. 23(*a*);

FIG. 24 is a schematic connection diagram for showing still another example of this invention;

FIG. 25 shows the characteristic of a low loss backward diode.

The conventional MPA is, as shown in FIG. 1, constructed by use of only one magnetic core (A, B, or C). The input windings ($N_{2A}$, $N_{2B}$ . . . ) and output windings ($N_{1A}$, $N_{1B}$ . . . ) of the MPA are in parallel with the clock pulse source.

Typical circuits of the MPA of FIG. 1 are shown in FIGS. 2 and 3(*a*).

In the circuit of FIG. 1, wherein Z, A, B and C are magnetic cores, CR1, CR2 and CR3 are diodes, and ZA, AB and BC are coupling networks, the induced voltage in the output winding $N_{1A}$ wound on the magnetic core A of the first stage, when a clock pulse current $I_0$ is applied to the reading winding $N_{0A}$, it causes a current I to flow into the input winding $N_{2B}$ wound on the magnetic core B of the MPA in the next stage. When a data transfer to the magnetic core B is to be carried out by only the current I caused by the induced voltage in the output winding $N_{1A}$, it is very difficult to provide many branches because the magnetic core B has to be reversed by only the current I, and data transfer speed is slow because of low speed of polarity reversal of the magnetic core. Furthermore, it is pointed as a cause of difficulty of providing many branches to make the turn ratio of the windings $N_{2B}$ to $N_{1A}$ large, because in case of application of the reading current $I_0$, the voltage induced in the input winding is apt to cause data transfer of reverse direction. Accordingly, the following circuits as shown in FIGS. 2 and 3(*a*) have been proposed. Referring to FIGS. 2 and 3(*a*), CR1 and CR2 are diodes, $R_1$ and $R_2$ are resistors and the input winding of the next stage is divided into two sections, and the clock pulse current $I_0$ is applied to the center of said divided windings $\frac{1}{2}N_{2B}$ and $\frac{1}{2}N_{2B}$.

When the stored binary information in the magnetic core A is 0, since the clock pulse current $I_0$ is uniformly divided into the divided windings $\frac{1}{2}N_{2B}$ and $\frac{1}{2}N_{2B}$, the magnetic polarity of the magnetic core B is not reversed, thus causing transfer of the information signal 0. However, if the state of the magnetic core A has a stored binary information signal 1, a clock pulse current $I_0$ must be made to split, to the output winding $N_{1A}$ of the magnetic core A, and a voltage will be induced in the output winding $N_{1A}$, whereby an electric current I is made to flow as a loop current.

Since the electric current I passes through the windings $N_{1A}$ and $N_{2B}$ as a loop current, a current corresponding to 2I is written in the magnetic core B as the information signal 1. In the circuit of FIG. 2, the current ($I_s$—$I$) flows through the winding $N_{1A}$ and sets the magnetic core A, but a pulse of wide pulse width is necessary in order to obtain a core state which is set sufficiently, whereby the data transfer speed is made slow.

In the circuit of FIG. 3(*a*), a setting winding $N_0$ is provided to improve the circuit of FIG. 2. In the circuit of FIG. 3(*a*), the magnetic core A is set by the clock pulse current $I_0$ flowing through said winding $N_0$. This setting is completed in the switching time $T_0$ determined by the ampere-turn of $N_0I_0$, and data signal current flows through the input winding $\frac{1}{2}N_{2B}$ of the next stage during said period of time $T_0$. Accordingly, even when a pulse current of rectangular wave form is used as the clock pulse current $I_0$ as in the case of FIG. 3(*b*), the input signal 2I applied to the input winding $\frac{1}{2}N_{2B}$ wound on the magnetic core B is controlled by the switching wave form of the magnetic core A, thus causing impossibility of obtaining a refined transfer signal and of using a clock pulse current having any pulse width.

For attaining effectively the above-mentioned setting and making the transfer signal large as much as possible, the pulse width of the clock pulse current $I_0$ must be equal to the time $T_0$.

Furthermore, in the circuit of FIG. 1, the electric current I caused by the induced voltage in the winding $N_{1A}$ becomes a transfer signal, and by this signal, the polarity of the magnetic core B of the next stage has to be reversed. Similarly, in the circuits of FIGS. 2 and 3(*a*), the current 2I becomes the transfer signal. However, this signal is not generally the current having a sufficiently large amplitude, thus requiring a large period of time for the reversal of the polarity of the magnetic core B and causing insufficient recording or writing of the transfer signal. Accordingly, the current I produced from the output winding of the magnetic core B and applied to the next stage becomes small, so that there is the possibility that successive data transfer may become gradually weak and at last fade away to nothing.

In order to insure the tolerance of the circuit, the resistors $R_1$ and $R_2$ are indispensably necessary, whereby branching characteristics of the MPA is made unfavorable.

According to this invention, a driving pulse train is constructed and windings are arranged so that data writing-in and reading-out at one stage can be independently carried out without the accompaniment of the above-mentioned disadvantages of the circuits of FIGS. 1–3(*a*). Furthermore, in this invention, the clock pulse current fed from a constant current pulse source is used to obtain a completely refined output current which is entirely similar to the clock pulse current, and such resistors for ensuring tolerance as the resistors $R_1$ and $R_2$ in the circuits of FIGS. 2 and 3(*a*) are not necessary; the number of available branches becomes $$\left(\frac{N_1}{N_2}-k\right)$$

wherein $k$ is number of equivalent branches caused by positive direction loss of the diodes, thus causing possibility of providing many branches; and an output signal having a constant current character can be obtained without relation to the variation of load because of partial setting action during the reading-out period.

Accordingly, according to this invention, it is possible to carry out a logical operation based on the majority decision principle at the input stage, to carry out another logical operation which is analogous to that of a relay network at the output stage, said operations being carried out independently of each other, and to carry out combination of the logical operations.

Referring to FIG. 4(*a*), on the magnetic cores $M_1$ and $M_2$, each having a rectangular hysteresis character such as shown in FIG. 6 are wound the following windings:

(1) Input signal windings $N_1$, $N_2$ and $N_3$ for feeding an information pulse signal from the previous stage, (2) A constant signal winding $N_c$ for feeding a constant pulse current signal, (3) A bias pulse current winding W for feeding a biasing current which is necessary to assist the operation of information writing, (4) A setting current pulse winding S for applying a setting pulse current to make the state of each magnetic core return to its initial state prior to information writing-in, and (5) An output winding $N_0$ for reading out the states of the magnetic cores by supplying a reading pulse current $I_r$ thereto during the reading-out period.

Among the above-mentioned windings, the input signal windings $N_1$, $N_2$ and $N_3$, constant signal winding $N_c$ and output winding $N_0$ are wound on the magnetic cores $M_1$ and $M_2$ in the same direction, and the bias pulse current winding W and setting pulse current winding S are wound on each of the cores, in the reverse direction. Gating elements $G_1$ and $G_2$ are connected, respectively, to the coils of the output winding $N_0$, and load impedances $Z_1$ and $Z_2$ are, respectively, connected to the terminals X and $\overline{X}$ for obtaining, respectively, complemental output signal currents.

The gating elements act to make the impedance of the loop circuit composed of the output winding high during the information writing-in period, thus carrying out efficiently the information writing-in.

In the circuits of FIG. 4(*b*) and FIG. 4(*c*) are shown actual constructions of the gating element. In the circuit of FIG. 4(*b*), magnetic elements having rectangular hysteresis loop characteristics, for example, transformers $T_1$ and $T_2$, are used as the gating elements. This circuit relates to a circuit wherein a bias current is applied to the magnetic gating element when a writing bias current is applied thereto, thus causing a high impedance against the loop current produced in the output winding.

In FIG. 4(*c*) is shown another embodiment wherein rectifying elements such as diodes are used as the gating elements. In this case, when a writing bias current is applied, the loop circuit composed of the output winding assumes a state of high impedance in accordance with the nonlinear characteristics of the rectifying element, and assumes a state of a low impedance in the case of application of a reading pulse current $I_r$. In the circuits of FIGS. 4(*a*), 4(*b*), and 4(*c*), the impedances of the input winding of the next stage are represented by $Z_1$ and $Z_2$, respectively. FIG. 5(*a*) shows a schematic diagram for constructing the circuit system of FIG. 4. The system is divided into two groups. Two clock phases are required to complete a cycle of operation. The clock pulse trains are shown in FIG. 5(*b*). It is assumed that the said circuit is in a first phase. At a time $t_1$, a setting pulse current $I_s$, the amplitude of which is enough to set the magnetic core to the state of $B_r$ in the major hysteresis loop in FIG. 6, is applied to the winding S and brings the magnetic cores $M_1$ and $M_2$ to the states of $-B_r$ and $+B_r$, respectively. The states will be denoted as (—) and (+), respectively, in the following description.

Then, at a time $t_2$, a bias pulse current $I_w$ having an amplitude capable of producing a magnetism corresponding to the coercive force of the magnetic core is applied to the winding W, thereby inducing magnetic forces $+H_c$ and $-H_c$ in the magnetic cores $M_1$ and $M_2$, respectively.

At the same time, information input pulse signals and a constant current pulse signal $I_c$ are applied to the input windings $N_1$, $N_2$ and $N_3$ and the constant signal winding $N_c$ according to the combination of the logics at the input stage. If the resultant signal of the logics at the input stage is positive and corresponds to $+I_i$, the effective pulse current applied to the magnetic core $M_1$ becomes $(+I_i+I_w)$, thus changing the state of the magnetic core $M_1$ to the state of $+B_r$ (to the point C in FIG. 6).

Furthermore, the effective pulse current applied to the magnetic core $M_2$ becomes $(+I_i-I_w)$, so that the state of the magnetic core $M_2$ is not changed and stays in the state of $+B_r$ (the point *b* in FIG. 6).

In the above case, both the magnetic cores $M_1$ and $M_2$ become (+) state.

On the contrary, if the resultant signal of logics at the input stage is negative and corresponds to $-I_i$, the effective pulse current applied to the magnetic core $M_1$, becomes $(-I_i+I_w)$ and that applied to the magnetic core $M_2$ becomes $(-I_i-I_w)$, whereby the states of the magnetic cores $M_1$ and $M_2$ are, respectively, changed to the points *a* and *d* in FIG. 6. In this case, both the magnetic cores $M_1$ and $M_2$ becomes (—) state.

As described above, the resultant signal of logics at the input stage of the circuit is written into the circuit, and the information signal is memorized in the magnetic cores until the next reading-out period.

When the reading-out pulse current $I_r$ is applied to the output winding $N_0$ at a time $t_3$, the impedance of one coil of the output winding wound on the magnetic cores $M_1$ and $M_2$ becomes high against the current $I_r$, and that of the other coil becomes low, according to the core states.

For example, if the states of both the magnetic cores are (+) and a reading-out pulse current $I_r$ is applied, this current $I_r$ is divided into two currents $I_1$ and $I_2$, as shown in FIG. 4. The current $I_1$ changes the excursion state of the magnetic core $M_1$ from the point *c* to point *e* (FIG. 6), whereby said core assumes a low impedance; on the contrary, the current $I_2$ changes the excursion state of the magnetic core $M_2$ from the point *b* to the point *f* (FIG. 6), whereby said core assumes a high impedance, and after application of the reading-out pulse current $I_r$, the state of the magnetic core $M_2$ becomes the point *g* in FIG. 6. Accordingly, the greater part of the reading-out pulse current $I_r$ is $I_1$, and the current $I_2$ is very much smaller than the current $I_1$.

On the other hand, if both of the magnetic cores $M_1$ and $M_2$ are in the state of (—), the output winding of the core $M_1$ assumes a high impedance against the reading-out current $I_r$, and that of the core $M_2$ assumes a low impedance, whereby the greater part of the current $I_r$ flows as the current $I_2$.

As described above, the magnetic core assuming a high impedance keeps its high impedance state during the reading-out period and is retained at its state partially switched to the point of *f* in FIG. 6. The partially switched point *f* depends on the load and tends to move successively to the points $f_a$, $f_b$, $f_c$ and so on, with the decrease of the load as shown in FIG. 6. However, the field applied to the core by the variation of the point *f* is almost equal, so that the output current is maintained at its constant value.

Variation of the output signal due to load variation shows, as will be understood from the experimental result of FIG. 7, very favorable constant current characteristics. The output signal has an output wave form which is entirely equal to that of the clock pulse current. The results of FIGS. 7 and 8 have been obtained in connection with the case wherein the following windings and core were used:

$N_1$=3 turns
$N_c$=3 turns
$W$=1 turn
$S$=1 turn
$N_0$=45 turns

Ferrite core having an external diameter of 2 mm., internal diameter of 1.2 mm. and height of 0.6 mm.

Consequently, differing from the circuits of FIGS. 1–3(*a*), the wave form of the output current $I_1$ is very favorable and is quite similar to that of the clock pulse current.

Since the clock pulse current is fed from a driving pulse source capable of producing a constant amplitude, the output current of the circuit is entirely amplified and limited. These output currents $I_1$ and $I_2$ become the input signals to be applied to the input circuit of the next stage. Since in such a manner as described above, the input signal is applied as the refined constant pulse current, the effect of the binary pulse current, differing from the case of the circuit of FIG. 1–3(*a*), is very effective, thus enabling complete memorization of the information signal in the core state, as shown in the experimental result of FIG. 8, even when an input signal of a minor value is used, whereby an entirely amplified and limited output signal can be obtained in the case of reading-out.

When at a time $t_4$, the setting current $I_s$ is applied, just as in the case of application at the time $t_1$, to the setting current winding $N_s$, the state of the magnetic core $M_1$ is brought to the point *a* in FIG. 6, and that of the magnetic core $M_2$ to the point *b* from the point *g*, whereby both cores are set at their initial states. Thus, the operation is repeated in the same manner as described above. Loop current can be prevented from flowing by means of diodes in the writing-in period as described heretofore, but it is possible to prevent the loop current by means of of the internal impedance of the power source in case setting is taking place.

According to the characteristics of the circuit of FIG. 4, the following favorable effects are obtained.

(1) According to the characteristics of partially switching of the high impedance, a well refined output signal current is always obtained in spite of change of the load impedance.
(2) Setting current $I_s$ can restore the circuit to its initial state even after each reading-out period has elapsed, and ensures reliable high speed operation.
(3) No elements other than the magnetic cores and gating elements are necessary.
(4) The biasing writing pulse current $I_W$ participates in complete memorization of the input information signal in the magnetic core.
(5) It is possible to obtain many branches.
(6) As the writing-in period of the said circuit is distinguished from the reading-out period of the said circuit, the logics at the input stage and output stage are performed independently.
(7) Combination of the logics at both the input and output stages is exactly attainable.

Because of the above-mentioned favorable characteristics, the circuit can perform, with high speed and reliability, any complicated logical operation, not only at the input stage, but also at the output stage of the said circuit.

FIG. 9 shows a circuit wherein single transfer of the information signal is carried out. In the circuit of FIG. 9, one of the output terminals X of the circuit element $x$ is connected to the input signal winding $N_1$ of the circuit element $y$ in the positive direction, and a constant signal current $I_c$ which is just half of the output signal corresponding to the binary information "1" is applied to the winding $N_c$ of the element $y$ in the negative direction.

If the information in the said element $x$ is "1" of binary notation, the output current $I_1$ is obtained at the terminal X and results in application of the positive input signal to the element $y$, thus resulting in production of an output signal at the output terminal Y, of the element $y$.

On the other hand, if the information in the element $x$ is "0" of binary notation, an output current signal does not appear in the terminal X, and the result is application of a negative input signal to the element $y$, thus causing no output signal at the terminal Y of the said element $y$. These facts are shown in Table 1.

*Table 1*

| x | y |
|---|---|
| 1 | 1 |
| 0 | 0 |

As shown in Table 1, the single transfer logic can be obtained. On the contrary, the single transfer circuit is also obtained in such a manner as shown in FIG. 10. In this circuit, the terminal $\overline{X}$ of the element $x$ is connected to the input signal winding of the other element $y$ in the negative direction, and a constant signal current $I_c$ is applied to the constant current winding $I_c$ of said element $y$ in the positive direction. If the element $x$ holds a signal "1" of binary notation, there is no output signal at the terminal $\overline{X}$, and a positive input signal does vary the state of the said element $y$, thus obtaining an output signal at the terminals Y of the said element $y$.

On the other hand, if the said element $x$ holds a signal "0" of binary notation, an output signal appears at the terminal $\overline{X}$, and a negative input signal does not vary the state of the element $y$, thus not obtaining any output signal at the terminal Y. These operations correspond to the logics of Table 1.

The load impedance $Z_{L2}$ in FIG. 9 and $Z_{L1}$ in FIG. 10 correspond, respectively, to the input impedances of the other logical elements. These circuits of FIGS. 9 and 10 are shown symbolically in FIGS. 11(*a*) and (*b*), respectively, wherein: A large circle corresponds to the said element; a solid line extending from left to right shows the connection of the output terminal to the input terminal; a small circle denotes the terminal $\overline{X}$ of the said element $x$, and a short vertical bar on the solid line shows the connection of the input terminal in the negative direction; (−) in the large circle represents a constant current signal applied in the negative direction; and (+) in the large circle represents a constant current signal applied in the positive direction. A "Not" circuit can be easily obtained in such a manner as shown in FIGS. 12(*a*) and (*b*). Furthermore, branching can be attained by connecting the input windings of many elements $y_1, y_2 \ldots y_n$ of the output stage in series as shown in FIG. 13. This is also shown symbolically in FIG. 14.

While the above description relates to the logical circuit of one variable, the logical circuit of two variables will be described in the following. FIG. 15(*a*) shows one illustration of the logical circuit of two variables and represents logical sum. Let it be assumed that input variables are, respectively, $x$ and $y$. The output terminal X of one circuit element $x$ is connected to one input winding of the circuit element $z$ of the next stage in the positive direction, whereby +X is represented at the output side of said element $z$. On the other hand, the output terminal $\overline{Y}$ of the circuit element $y$ is connected to another input winding of the said circuit element $z$ in the negative direction, whereby $-\overline{Y}$ is represented at the output side of said element $z$. Furthermore, a constant signal $I_c$ which is ½ of the output signal is applied to the constant input winding $N_c$ in the positive direction, whereby +C is represented at the output side of said element $z$. These are assumed to be notations of the connections at the input stage in this logical circuit and are represented by the following equation.

$$Z=X-\overline{Y}+C \qquad (1)$$

In the Equation 1;

(1) If $x=0$, $y=0$; $X=0$, $\overline{Y}=1$, then, $Z=0-1+½=-½$, whereby the input signal of the element $z$ becomes negative, and an output corresponding to binary digit "0" will be obtained from the element $z$.

(2) If $x=1$ and $y=0$; $X=1$, $\overline{Y}=1$, then, $$Z=1-1+½=½$$

whereby, the input signal of said element $z$ becomes positive, and an output current corresponding to binary digit "1" will be obtained from the said element $z$.

(3) If $x=0$ and $y=1$; $X=0$ and $\overline{Y}=0$, then, $$Z=0-0+½=½$$

This case is the same as the case of (2), and an output current corresponding to binary digit "1" will be obtained from the said element $z$.

(4) If $x=1$ and $y=1$; $X=1$ and $\overline{Y}=0$, then, $$Z=1-0+½=³⁄₂$$

whereby the input signal of said element $z$ becomes positive, and an output current corresponding to binary digit "1" will be obtained from the said element $z$.

The above logical operations are summarized as shown in the following Table 2 which shows logical sum.

*Table 2*

| $x$ | $y$ | $z$ |
|---|---|---|
| 0 | 0 | 0 |
| 1 | 0 | 1 |
| 0 | 1 | 1 |
| 1 | 1 | 1 |

The circuit of FIG. 15($a$) can be symbolically represented by FIG. 15($b$).

In the logical circuit of FIG. 15($a$), if the constant signal current $I_c$ is applied in the negative direction, the Equation 1 becomes as shown by the following Equation 2.

$$Z=X-\overline{Y}-C \qquad (2)$$

The Equation 2 represents a so-called logical product. Two variable logical operations represented by the Equations 1 and 2 can be summarized as shown by the Table 3.

*Table 3*

| Logics | Input winding connection |
|---|---|
| $x+y$ | $X-\overline{Y}+C$ |
| $\bar{x}+\bar{y}$ | $\overline{X}-Y+C$ |
| $x.y$ | $X-\overline{Y}-C$ |
| $\bar{x}.y$ | $\overline{X}-\overline{Y}-C$ |
| $x.\bar{y}$ | $X-Y-C$ |
| $\bar{x}.\bar{y}$ | $X-\overline{Y}-C$ |
| $x+\bar{x}.\bar{y}$ | $X-Y+C$ |
| $\bar{x}+x.y$ | $\overline{X}-\overline{Y}+C$ |

Next, a logical circuit of three variable type will be described in connection with FIG. 16, wherein three input signals $x$, $y$ and $z$ are, respectively, applied to the input circuit elements $x$, $y$ and $z$; output terminals $X$, $Y$ and $\overline{Z}$ of the elements $x$, $y$ and $z$ are connected to respective terminals of the input windings of the circuit element U of the next stage in the positive direction, positive direction and negative direction, respectively; and the constant current $I_c$ is applied to the constant current winding $N_c$ of said element U in the negative direction, said current $I_c$ being selected to be an odd integer multiple of half of the current corresponding to the output signal "1." This circuit is represented by the following Equation 3.

$$u=X+Y-\overline{Z}-C \qquad (3)$$

(1) If $x=0$, $y=0$ and $z=0$; the output signals of said circuit elements $x$, $y$ and $z$ become, respectively, "0," "0," and "1," whereby the Equation 3 becomes as follows.

$$u=0+0-1-\tfrac{1}{2}=-\tfrac{3}{2}$$

Accordingly, a negative input signal is applied effectively to the circuit element U, whereby an output corresponding to binary digit "0" will be obtained from said element U.

Similarly, the following results will be obtained.

(2) If $x=1$, $y=0$ and $z=0$; then, $X=1$, $Y=0$, $\overline{Z}=1$; and $$u=1+0-1-\tfrac{1}{2}=-\tfrac{1}{2}$$

(3) If $x=0$, $y=1$ and $z=0$; then, $X=0$, $Y=1$ and $\overline{Z}=1$; and $$u=0+1-1-\tfrac{1}{2}=-\tfrac{1}{2}$$

In each of the cases of (2) and (3), also, an output corresponding to binary digit "0" will be obtained from said element U. The circuit of FIG. 16 is symbolically represented by FIG. 17($a$). FIG 16 and FIG. 17($a$) show a logical operation circuit of majority decision type and represents the following logical Equation 4:

$$u=xyz+\bar{x}yz+x\bar{y}z+xy\bar{z} \qquad (4)$$

The above-mentioned representations are summarized as shown in the following Table 4.

*Table 4*

| $x$ | $y$ | $z$ | $u$ |
|---|---|---|---|
| 0 | 0 | 0 | 0 |
| 1 | 0 | 0 | 0 |
| 0 | 1 | 0 | 0 |
| 0 | 0 | 1 | 0 |
| 1 | 1 | 0 | 1 |
| 1 | 0 | 1 | 1 |
| 0 | 1 | 1 | 1 |
| 1 | 1 | 1 | 1 |

As another example of three variable inputs, the following connection may be considered.

$$u=X+Y-\overline{Z}+C \qquad (5)$$

This case is represented by symbolic notation as shown in FIG. 17($b$), and the logical circuit is represented by the following Equation 6.

$$u=x+y+z \qquad (6)$$

The logical operation of this circuit is summarized as shown in the following Table 5.

*Table 5*

| $x$ | $y$ | $z$ | $u$ |
|---|---|---|---|
| 0 | 0 | 0 | 0 |
| 1 | 0 | 0 | 1 |
| 0 | 1 | 0 | 1 |
| 0 | 0 | 1 | 1 |
| 1 | 1 | 0 | 1 |
| 1 | 0 | 1 | 1 |
| 0 | 1 | 1 | 1 |
| 1 | 1 | 1 | 1 |

As described above, when three variable inputs are used, a relatively complex logical operation can be attained by only one element.

Some examples of the relations between logics and input winding connections in the case wherein $I_c=\tfrac{1}{2}$ is represented by the Table 6.

*Table 6*

| Logics | Input winding connection | |
|---|---|---|
| $xyz$ | $X-\overline{Y}-\overline{Z}-C$ | |
| $\bar{x}yz$ | $\overline{X}-\overline{Y}-\overline{Z}-C$ | |
| $xy\bar{z}$ | $X-\overline{Y}-Z-C$ | |
| $\overline{xy}z$ | $\overline{X}-Y-\overline{Z}-C$ | |
| $\bar{x}y\bar{z}$ | $\overline{X}-\overline{Y}-Z-C$ | |
| $x\overline{yz}$ | $X-Y-Z-C$ | |
| $\overline{xyz}$ | $\overline{X}-Y-Z-C$ | |
| $x+y+z$ | $X+Y-\overline{Z}+C$ | |
| $\bar{x}+y+z$ | $\overline{X}+Y-\overline{Z}+C$ | |
| $x+\bar{y}+z$ | $X+\overline{Y}-\overline{Z}+C$ | |
| $x+y+\bar{z}$ | $X+Y-Z+C$ | |
| $\bar{x}+\bar{y}+x$ | $\overline{X}+\overline{Y}-\overline{Z}+C$ | |
| $\bar{x}+y+\bar{z}$ | $\overline{X}+Y-Z+C$ | |
| $x+\bar{y}+\bar{z}$ | $X+\overline{Y}-Z+C$ | |
| $\bar{x}+\bar{y}+\bar{z}$ | $\overline{X}+\overline{Y}-Z+C$ | |
| $xyz+\bar{x}yz+x\bar{y}z+xy\bar{z}$ | $X+Y-\overline{Z}-C$ | $X-\overline{Y}-\overline{Z}+C$ |
| $xyz+\bar{x}yz+\overline{xy}z+\bar{x}y\bar{z}$ | $\overline{X}+Y-\overline{Z}-C$ | $\overline{X}-\overline{Y}-\overline{Z}+C$ |
| $xyz+\overline{xy}z+x\bar{y}z+x\overline{yz}$ | $X+\overline{Y}-\overline{Z}-C$ | $X-Y-\overline{Z}+C$ |
| $xyz+\bar{x}y\bar{z}+xy\bar{z}+x\overline{yz}$ | $X+Y-Z-C$ | $X-\overline{Y}-Z+C$ |
| $\overline{xyz}+\bar{x}yz+x\bar{y}z+\overline{xy}z$ | $\overline{X}+\overline{Y}-\overline{Z}-C$ | $\overline{X}-Y-\overline{Z}+C$ |
| $\overline{xyz}+\bar{x}yz+xy\bar{z}+\bar{x}y\bar{z}$ | $\overline{X}+Y-Z-C$ | $\overline{X}-\overline{Y}-Z+C$ |
| $\overline{xyz}+x\bar{y}z+xy\bar{z}+x\overline{yz}$ | $X+\overline{Y}-Z-C$ | $X-Y-Z+C$ |
| $\overline{xyz}+\overline{xy}z+\bar{x}y\bar{z}+x\overline{yz}$ | $\overline{X}+\overline{Y}-Z-C$ | $\overline{X}-Y-Z+C$ |

When the constant current $I_c$ is selected to be equal to $\frac{3}{2}$, other different logical operations can be attained.

As will be understood from the above description, it is possible to carry out various logical operations of four variable system, five variable system and so on. Furthermore, by selecting said current $I_c$ so as to be odd integer multiples of $\frac{1}{2}$, the kinds of logical operations can be further increased.

As described above, in order to ensure the complex logical operation, the operations of the elements must be precise. Accuracy of logical operation depends upon the accuracy of magnetic flux reversal of the magnetic cores in the circuit elements. For the purpose of attaining this accuracy, various driving currents have to have constant current characteristics. The current value must be equal at the initial circuit element and final circuit element, phase delay must not occur, and particularly it is necessary to apply the pulse currents $I_r$ and $I_w$ at the same time as the application of other phase currents.

Since each of the binary pulse current windings and setting pulse current windings consists of only one turn, and their impedances are low, trouble does not occur even when the circuit elements of several hundred in number are connected in series, but it is necessary to make the internal impedance of the electric source high in order to obtain a constant current characteristic. For this reason, generally circuits utilizing vacuum tubes, each having a grounded plate, are used.

In order that the reading-out pulse current $I_r$ produce branches at the output terminal, there are systems wherein a constant current is applied by means of a high impedance power source to the circuit consisting of a plurality of the circuit elements which are connected in series. Of these systems, one illustration is shown in FIG. 18, wherein pulse transformers $T_3$ and $T_4$ are used for divisionally driving the circuit and for supplying the pulse current $I_r$. In this circuit, it is preferable to provide an auto-biasing circuit consisting of a R–C circuit in the output side of each of the said transformers in order to make the impedance at the electric source side, viewed from the circuit elements, high. These auto-biasing circuits may be fixed biasing circuits.

Similarly, as shown in FIG. 19, the constant current $I_c$ can be effectively supplied from the pulse transformer $T_5$ and $T_6$ as in the case of supplying the pulse current $I_r$. The turns ratio of the transformer is selected in accordance with the required amplitude of the output current. The system of FIG. 19 is almost equal to that of FIG. 18 except that diodes D are used in the place of the R–C circuits. According to the system of FIG. 19, it is possible to supply the circuit elements of much larger number with the constant current $I_c$ than in the case of supplying the pulse current $I_r$ without introducing diode loss into the output sides of the circuit elements.

As described above, the output windings of two magnetic cores $M_1$ and $M_2$ assume high impedance or low impedance in accordance with the effective input signal. In other words, passing of the pulse current $I_r$ through any one of the output windings is exactly analogous to making or breaking of the contact in a relay circuit. Furthermore, since in the system of the information writing-in period and information reading-out period are entirely independent, a logical operation which is analogous to that of a relay circuit can be attained at the output stage, the operation being entirely independent of that at the input stage. This embodiment is shown in FIG. 20(*a*), in which the output windings including diodes are divided and connected suitably in accordance with the required logics. In this circuit, since an output signal is obtained at the output terminal 1 in only the case of $x=1$ and $y=1$, this circuit forms a logical product. The circuit of FIG. 20(*a*) can be represented by the symbolic notation of a relay logical circuit, as shown in FIG. 20(*b*) or by the symbolical notation as shown in FIG. 20(*c*). In FIG. 20(*c*), the double circle represents the logics at the output stage, and the letter A represents an "AND" circuit.

One of the most powerful logics at the output stage is the high speed carry detector in parallel addition. In a parallel adder capable of carrying out a high speed arithmetic operation, carry propagation limits the operation speed. With the purpose of eliminating the speed limitation due to the carry propagation, many carry detecting circuits have been studied. However, most of them are very complex in construction and require a long period in carrying out the detection.

On the contrary, a high speed carry detection circuit using the above-mentioned circuit element of this invention is entirely simple and requires no period. This circuit of relay notation is shown in FIG. 21. The circuit connection of the output windings of one digit is shown in FIG. 22. The crcuit configuration in FIG. 21 depends upon the following arithmetic basis.

Now, it is assumed that two numerical values G and H are represented by the following equations.

$$G=g_0 2^0+g_1 2^1+g_2 2^2+\ldots g_i 2^i \ldots +g_n 2^n$$
$$H=h_0 2^0+h_1 2^1+h_2 2^2+\ldots h_i 2^i \ldots +h_n 2^n$$

In the above equations, letters $g_i$ and $h_i$ represent, respectively, binary digits "0" and "1."

Sum D of the values G and H is represented by the following equation.

$$D=d_0 2^0+d_1 2^1+d_2 2^2+\ldots +d_i 2^i + \ldots + d_n 2^n + d_{n+1} 2^{n+1}$$

In this case, there is the following equation.

$$d_i=c_{i-1} g_i h_i + c_{i-1} \bar{g}_i \bar{h}_i + \bar{c}_{i-1} \bar{g}_i h_i + \bar{c}_{i-1} g_i \bar{h}_i$$

In this equation, $c_{i-1}$ represents carry propagated from the lower digit.

For carry $c$ propagated from the lower digit, $$c_0=g_0 h_0$$
$$c_1=g_1 h_1+g_1 h_0+h_1 c_0$$
$$\cdots\cdots\cdots\cdots$$
$$c_i=g_i h_i+g_i c_i-1+h_i c_{i-1}$$
$$\cdots\cdots\cdots\cdots$$
$$c_n=g_n h_n+g_n c_{n-1}+h_n c_{n-1}$$

As shown in FIG. 6, the high impedance magnetic core has some low impedance portion ($b$–$b_1$ portion in FIG. 6) before excursion of high impedance portion. Sometimes, said low impedance portion of said high impedance core causes trouble in logics at the output stage, because the current relating to this low impedance portion decreases the effective output signal. To eliminate this unfavorable current a method is proposed. According to this method, a biasing pulse current, the amplitude of which is just equal to that of the unfavorable current, is also applied during the reading-out-period to the biasing pulse winding W. Then, any complex logics at the output stage can be easily performed without any trouble.

As previously mentioned, the combined logics at the input and output stages is applicable to our consideration.

An illustration of the combined logics is shown in FIG. 23(*a*), wherein AND logics of the output sides of the circuit elements $v$ and $w$ and OR logics of the output sides of the circuit elements $x$ and $y$, are obtained; the result of these output logics is combined with the output of the circuit element $z$; and this combined result is applied to the input side of the circuit element $u$ forming an AND circuit of said three signals. In this case, magnitude of the constant pulse current is selected to be $\frac{3}{2}$ and applied in the negative direction. The symbolic notation of the circuit of FIG. 23(*a*) is shown in FIG. 23(*b*). The logical operation of the circuit of FIG. 23(*a*) is illustrated in Table 7.

*Table 7*

| *v* | *w* | *x* | *y* | *z* | *u* |
|---|---|---|---|---|---|
| 0 | 0 | 0 | 0 | 0 | 0 |
| 1 | 0 | 0 | 0 | 0 | 0 |
| 0 | 1 | 0 | 0 | 0 | 0 |
| 0 | 0 | 1 | 0 | 0 | 0 |
| 0 | 0 | 0 | 1 | 0 | 0 |
| 0 | 0 | 0 | 0 | 1 | 0 |
| 1 | 1 | 0 | 0 | 0 | 0 |
| 1 | 0 | 1 | 0 | 0 | 0 |
| 1 | 0 | 0 | 1 | 0 | 0 |
| 1 | 0 | 0 | 0 | 1 | 0 |
| 0 | 1 | 1 | 0 | 0 | 0 |
| 0 | 1 | 0 | 1 | 0 | 0 |
| 0 | 1 | 0 | 0 | 1 | 0 |
| 0 | 0 | 1 | 1 | 0 | 0 |
| 0 | 0 | 1 | 0 | 0 | 0 |
| 0 | 0 | 0 | 1 | 1 | 0 |
| 1 | 1 | 1 | 0 | 0 | 0 |
| 1 | 1 | 0 | 1 | 0 | 0 |
| 1 | 1 | 0 | 0 | 1 | 0 |
| 1 | 0 | 1 | 1 | 0 | 0 |
| 1 | 0 | 1 | 0 | 1 | 0 |
| 1 | 0 | 0 | 1 | 1 | 0 |
| 0 | 1 | 1 | 1 | 0 | 0 |
| 0 | 1 | 0 | 0 | 1 | 0 |
| 0 | 1 | 0 | 1 | 1 | 0 |
| 0 | 0 | 1 | 1 | 1 | 0 |
| 1 | 1 | 1 | 1 | 0 | 0 |
| 1 | 1 | 1 | 0 | 1 | 0 |
| 1 | 1 | 0 | 1 | 1 | 1 |
| 1 | 0 | 1 | 1 | 1 | 0 |
| 0 | 1 | 1 | 1 | 1 | 0 |
| 1 | 1 | 1 | 1 | 1 | 1 |

As will be understood from the above description, various combinations of the logics at the input and output stages are easily adaptable, and the output signals of the circuit elements become 1 or 0 in accordance with the binary number "1" or "0."

In the case where +1 and −1 signals are required, it is better to combine said circuit elements in such a manner as shown in FIG. 24.

Referring to FIG. 24, the output circuit consists of a bridge circuit, and the output signals +1 and −1 are obtained at the terminals $T_0$.

This circuit itself can perform very high speed logical operation. However, for a higher speed logical operation, the switching time of the magnetic material must be shorter. For this purpose, thin film magnetic materials have a most prospective future in switching techniques. In order to utilize effectively a thin film magnetic material, the circuit has to use low loss diodes, for example backward diodes having a characteristic as shown in FIG. 25 as the gating means.

We claim:

1. A logical element attaining a logical operation in either input side and output side independently comprising, two magnetic cores having substantially rectangular hysteresis characteristics, input means having at least one winding having two coils wound respectively on said cores and connected in series for applying input information current pulses having a plus or minus polarity and the same intensity and corresponding to "0" and "1" binary notation, setting means comprising a winding having two coils wound respectively on said cores with one of said two coils wound in the same sense as one of the coils of said winding of said input means and wound on a common core therewith, the other of said two coils having a reverse winding sense as that of said coil of said winding of the input means and wound on the same core and connected in series therewith, said setting means comprising leads for applying a setting pulse current having an amplitude sufficient to set said cores respectively in the states of plus and minus polarities before the application of said input information pulse current, writing bias means comprising a winding having two coils wound respectively on said cores and connected in series for applying a writing bias current pulse having an amplitude capable of producing a magnetic force approximately equal to the coercive force of said cores in reverse polarities to those caused by said setting pulse current simultaneously with the application of said input information pulse current, constant input means comprising a winding having two coils wound respectively on said cores in the same polarities as those of the coils of the winding of said input means wound on the same cores and connected in series for applying a constant current pulse having an amplitude approximately equal to an odd number which is a multiple of one-half of the amplitude of said input information current pulse simultaneously with the application of said input information current pulse and for effecting a writing-in operation in conditions of residual magnetism of said cores decided by the polarity of said input pulse current and the polarity of this constant pulse current, output means comprising an output winding having two coils wound on said cores respectively in a reverse sense to the coils of the input means wound on the same cores and connected in series for deriving output current pulses, two load impedances each having two terminals to be connected to said output winding, gating means connected for passing therethrough only output current pulses other than output loop current into said load impedances, and read-out means provided at a connection point of two coils of said output winding and a connection point of said series connected two load impedances for applying a read-out current pulse capable of causing said output pulse current.

2. A logical element according to claim 1, in which said gating means comprises a rectifying element.

3. A logical element according to claim 1, in which said gating means comprises a transformer wound on a core having substantially rectangular hysteresis characteristic, said transformer having a secondary winding connected for receiving said output current pulse and a primary winding receptive of a bias current to cause said transformer to assume a high impedance against loop current produced in said output means at intervals other than the intervals said output current pulses flow.

4. An improved logical circuit comprising, in combination, a plurality of logical elements each comprising two magnetic cores having substantially rectangular hysteresis characteristics, input means comprising at least one winding having two coils wound respectively on said cores and connected in series for applying input information current pulses having a plus or minus polarity and the same intensity, the polarity of said pulses corresponding to binary "1" and "0," setting means comprising a winding have two coils wound respectively on said cores with one of said two coils wound in the same sense as a coil of said winding of said input means wound on a same core therewith and the other of the setting winding two coils being wound in a reverse sense than that of a coil of said winding of the input means wound on same core therewith, said setting winding coils being connected in series for applying a setting current pulse having an amplitude sufficient to set said cores respectively in plus and minus polarities respectively before the application of said input informaiton current pulses, writing bias means comprising a winding having two coils wound respectively on said cores and connected in series for applying a writing bias current pulse having an amplitude capable of producing a magnetic force approximately equal to the coercive force of said cores in reverse polarities to those caused by said setting current pulse simultaneously with the application of said input information current pulse, constant input means comprising a winding having two coils wound on said cores respectively in the same polarities as those of said coils of said winding of said input means wound on the same respective cores and connected in series, said input coils comprising means for applying a constant pulse current having an amplitude approximately equal to one half of said input information pulse current simultaneously with the application of said information current pulses and for performing a write-in operation on conditions of residual magnetism of said cores decided by the polarity of said input current pulse and the polarity of said constant current pulse, output means comprising an output winding having two coils wound on said cores respectively in reverse polarities to those the coils of the input means wound on the same cores therewith and connected in series for deriving output current pulses, two series connected load impedances connected with said output winding two gating means connected for passing therethrough only said output current pulses applied to said impedances, and read-out means provided at the connection point of said two coils of said output winding and a connection point of said series connected two load impedances for applying a read-out current pulse capable of causing an individual one of said output current pulses, connections connecting at least one winding of the input means of one of said logical element as one of said series connected two load impedances of a corresponding other logic element.

5. An improved logical circuit according to claim 4, in which said logical elements comprise a first logical element and a second logical element for use as a single transfer circuit in said circuit connections connecting both the sense of connection between said one winding of said input means of the second logical element and the output of the first logical element connected with said one winding and the sense of said constant current pulse of the second element in reverse to each other, whereby when said constant current pulse of the second logical element is selected as a plus or minus polarity the positive polarity of residual magnetism of said cores of the second logical element is obtained when the state of the residual magnetism of the first logical element corresponds to a binary "1."

6. An improved logical circuit according to claim 4, in which said logical elements comprise, in combination, a first logical element and a second logical element, for use as a NOT circuit, in said circuit connections connecting both the direction of connection between said one winding of said input means of said second logical element and the output of said first logical element connected with said one winding and the direction of flow of said constant current pulse of the second logical element are reverse to each other, and whereby when said constant current pulse of the second logical element is selected as a plus or a minus polarity the negative polarity of the residual magnetism of said cores is obtained when the state of residual magnetism of the first logical element corresponds to a binary "1."

7. An improved logical circuit according to claim 4, in which said elements comprise, in combination, first, second and third logical elements for use as an OR circuit said third logical element having two windings comprising input means, one of said two windings of said input means of said third logical element being series connected to two load impedances of the first logical element in a positive direction, the other of said two windings of said input means of said third logical element being series connected to two load impedances of said second logical element in a negative direction, and said constant pulse current of said third logical element comprising a pulse having a positive polarity.

8. An improved logical circuit according to claim 4, in which said elements comprise, in combination, first, second, and third logical elements for use as an AND circuit, said third logical element comprises two windings comprising input means, one of said two windings of said input means of said third logic element comprising one of two load impedances of said first logical element in a positive direction, the other one of said two windings of said input means of said third logical element connected as one of two load impedances of said second logical element in a negative direction, and the sense of said constant pulse of said third logical element being applied with a negative polarity.

9. An improved logical circuit according to claim 4, in which said logical elements comprise, in combination, a first, a second, a third, and a fourth logical element for use as an OR circuit, said fourth logical element having three windings comprising input means thereof, one of said three windings of said input means of said fourth element connected as one of two series connected load impedances of the first logical element in a positive direction, two other windings of said input means of said fourth logical element connected as one of two series load impedances of said second and said third logical elements in a negative direction, and the polarity of said constant pulse current of the third logical element being a positive polarity.

10. An improved logical circuit according to claim 4, in which said logical elements comprise, in combination, a first, a second, a third, and a fourth logical element for use as an AND circuit, said fourth logical element comprising three windings comprising input means thereof, connections connecting one of said three windings of said input means of said fourth element as one of two series connected load impedances of said first logical element in a positive direction, connections connecting the other two windings of said input means of said fourth logical element each respectively as one of two series connected load impedances of said second and third logical elements in the negative direction, and the sense of said constant current pulse of the third logical element being selected as a negative polarity.

11. An improved logical circuit according to claim 4, in which said logical elements comprise, in combination, a first, a second, a third, and a fourth logical element for performing a logic operation comprising a decision by majority principle, said fourth logical element comprising three windings comprising input means thereof, connections connecting two of said three windings of said input means of said fourth logical element respectively as one of two series connected load impedances of said first and second logical elements in the positive direction connections connecting the other of said three windings of input means of said fourth logical element as one of two series connected load impedances of said third logical element in the negative direction, and the sense of said constant current pulse current of said third logical element being selected as a negative polarity.

12. An improved logical circuit according to claim 4, in which said logical elements comprise, in combination, a first, a second, a third, and a fourth logical element for performing a logical operation of decision by majority principle, said fourth logical element having three windings comprising the input means thereof, connections connecting two of said three windings of said input means of said fourth logical element respectively as one of the two series connected load impedances of said first and the second logical elements in a negative direction, connections connecting the other of said three windings of said input means of said fourth logical element as one of the two series connected load impedances of said third logical element in a positive direction, and the sense of said constant current pulse current of said third logical element being selected as a positive polarity.

13. An improved logical circuit comprising, in combination, a plurality of logical elements, each of said logical elements comprising two magnetic cores having substantially rectangular hysteresis characteristics, input means comprising at least one winding having two coils wound respectively on said cores and connected in series for applying input information current pulses having a plus or minus polarity and the same intensity, said information pulses having their polarity representative of binary conditions "1" and "0," setting means comprising a winding comprising two series connected coils wound respectively on said cores in which one of said two coils is wound in the same sense as that of said coil of said input means wound on the same core and the other of said two coils is wound in a reverse sense than said coil of said winding of said input means wound on the same core for applying a setting current pulse having an amplitude enough to set said cores in a plus and minus polarities respectively before the application of said input information current pulses, write-in means comprising a winding comprising two series connected coils wound respectively on said cores and connected for applying a write-in current pulse having an amplitude sufficient for producing a magnetic force approximately equal to the coercive force of said cores in reverse polarities to those caused by said setting current pulse simultaneously with the application of said input information current pulses constant input means comprising a winding comprising two series connected coils wound on said cores respectively in the same sense as those of said coils of said winding of said input means on the same cores for applying a constant current having an amplitude approximately equal to one half the amplitude of said input information current pulses simultaneously with the application of said information current pulses for performing a write-in operation in conditions of residual magnetism of said cores decided by the polarity of said input current pulses and the polarity of said constant current pulse, output means comprising an output winding comprising two sense coils connected in series and wound on said cores respectively in reverse to those of said coils of said input means wound on the same cores for driving output pulses, two series connected two impedances connected with said output winding, two gating means connecting said impedances respectively to said output winding coils for passing therethrough only said output current pulses into said impedances, and read-out means provided at the connection point of said two coils of said output winding and a connection point of said two series connected load impedances for applying a read-out current pulse capable of causing said output current pulses, connections connecting one winding of each of the input means of each logical element except one logical element as one of said two series connected load impedances of a logical element.

14. An improved logic circuit comprising, in combination, one logical element comprising, two magnetic cores each having a substantially rectangular hysteresis characteristic; input means comprising at least one winding comprising two coils wound on said cores respectively and connected in series for applying at least discrete input information current pulses having a plus or minus polarity representative of a binary condition "1" and "0," and having the same intensity, setting means comprising a winding comprising two series coils wound on said cores respectively with one of said two coils being wound in the same sense as that of a coil of said input means wound on the same core therewith and the other of said two coils having a reverse sense than that of coil of said winding of said input means wound on the same core therewith, for applying a setting pulse current having an amplitude enough to set said cores in condition of plus and minus polarities before application of said input information current pulses, write-in means comprising a winding comprising two coils wound on said cores respectively and connected in series for applying a write-in current pulse having an amplitude capable of producing a magnetic force approximately equal to the coercive force of said cores in the reverse polarities to those caused by said setting current pulse simultaneously with the application of individual ones of said input information current pulses, constant input means comprising a winding comprising two coils wound on said cores respectively in the same sense as the coils of said input means on the same cores therewith and connected in series for applying a constant current pulse having an amplitude approximately equal to half the amplitude of said input information current pulses simultaneously with the application of said information current pulses and performing write-in operations in the states of residual magnetism of said cores decided by the polarity of said input current pulses and the polarity of the constant current pulses, output means comprising output windings comprising two coils wound on said cores respectively in the reverse polarities to those of the coils of the input means wound on the same cores and connected in series for deriving output current pulses, two series connected load impedances connected to said output winding, two gating means connected for passing therethrough only said output current pulses into said impedances, and read-out means provided at a connection point of two coils of said output winding and a connection point of said two series connected load impedances for applying a read-out current capable of causing said output current pulses, another logical element comprising said two magnetic cores, input means, setting means, writing bias means, and constant input means all constructed similarly to the first-mentioned logical element, and output means comprising two coils wound on said cores respectively in reverse polarities to those of the coils of the input means wound on the same cores, two gating means connected for passing only output current pulses, each of said two coils and each of said two gating means of respective one of said logical element being connected in series with output means of said one logical element and constructed respectively as two series connected unit circuits, connections connecting said logical circuit so that said series-connected unit circuits of the other logical elements are connected respectively with series connected circuits of one logical element each comprising said output coil, and said gating means in which said series connected unit circuit of respective logical element is connected in series and the other of said series connected circuits is connected in parallel.

15. An improved logic circuit according to claim 14, in which said circuit comprises an OR circuit, including connections connecting a single logical element said other logical element connected with said one logical element, and connections for connecting one series connected unit circuit of said single logical element for causing output digit "1" when residual magnetism of said cores is of a positive polarity and is connected in parallel with one series connected circuit of said one logical element for causing output digit "1."

16. An improved logical circuit according to claim 14, for operation as an AND circuit, including connections connecting a single logical element as said other logical element connected with said one logical element, and one series connected unit circuit of said single logical element causing output digit "1" in the case when residual magnetism of said cores are positive polarity connected in series with one series connected circuit of said one logical element causing output digit "1" in the same case.

17. An improved logical circuit according to claim 14, for performing high speed carry detection; wherein said series connected unit circuit of one of logical element among said other logical elements are connected respectively with said series connected circuit of said one logical element each consisting of said output coil and said gating means in the states in which one is connected in series and the other in parallel, the plural groups each consisting of two pair of logical elements are provided, each of said groups comprising ladder connections of a lattice type comprising said series connected unit circuit of said two pairs of logical elements of respective groups in conditions in which two pairs of series connected unit circuits each belong to respective one pair of logical elements respectively connected as series branches of said ladder connections respectively after connection in parallel each other, another two pairs of series connected unit circuits each connected as respective ones of logical elements respectively operable as shunt branches of said ladder connection respectively after connection in series each other; said improved logical circuit being constructed in combination of cascade arrangement of said fundamental connection and said plural groups and in provision of another reading out terminal at output terminal of last connected ladder connection group connected together.

18. An improved double element logic circuit comprising, in combination, a first and a second logic element for obtaining output current signals representative of either digit "+1" and digit "−1," said first logic element comprising, two magnetic cores having substantially rectangular hysteresis characteristics, input means comprising at least one winding comprising two coils wound on said cores respectively and connected in series for applying input information pulses having a plus or minus polarity and the same intensity, setting means comprising a winding having two coils wound on said cores respectively with one of two coils being wound in the same sense as that of a coil of said input means wound on the same respective core and the other of said two coils having a reverse sense than that of the coil of said winding of said input means wound on the same respective core, connections connecting said setting means coils in series for applying a setting pulse having an amplitude sufficient to set said cores in conditions of plus and minus polarities respectively before the application of said input information pulses writing means comprising a winding comprising two coils wound on said cores respectively and connected in series for applying a write-in pulse current having an amplitude capable of producing a magnetic force approximately equal to the coercive force of said cores in polarities reverse to those caused by said setting pulse current simultaneously with the application of said input information pulses, constant input means comprising a winding comprising two coils wound on said cores respectively in the same sense as the coils of said input means on the same cores and connected in series for applying a constant current pulse having an amplitude approximately equal to an odd number multiple of one half of the amplitude of said input information pulses simultaneously with the application of said information pulses for performing a write-in operation in a condition of residual magnetism of said cores decided by the polarity of said input pulses and the polarity of said constant current pulse, output means comprising an output winding comprising two coils wound on said cores respectively in reverse polarities relative to those of the coils of the input means wound on the same respective cores and connected in series for deriving output current pulses, two series connected load impedances connectable in circuit said output winding, two gating means connected for passing therethrough only said output pulses into said impedances, and read-out means provided at a connection point of the two coils of said output winding and a connection point of said series connected two load impedances for applying a read-out current capable of causing said output pulse current; the second logical element comprising, two magnetic cores, input means, setting means, writting bias means and constant input means similarly to the first logic element, and output means comprising two coils wound on said cores respectively in reverse polarities to those of the coils of the input means wound on the same cores, two gating means for passing only output pulses connections connecting each of said two coils of said input means and each of said two gating means of respective logical elements in series, and two series connected unit circuits connected with output means of said one logical element; said double element logical circuit comprising connections connecting said series connected unit circuits of the second logical element respectively as said series connected two load impedances of said first means for obtaining said output pulse current at the first logical element and the second logical element.

19. A logical element attaining a logical operation in either input side and output side independently comprising, two magnetic cores having substantially rectangular hysteresis characteristics, input means having at least one winding having two coils wound respectively on said cores and connected in series for applying input information current pulses having a plus or minus polarity and the same intensity and corresponding to "0" and "1" binary notation, setting means comprising a winding having two coils wound respectively on said cores with one of said two coils wound in the same sense as one of the coils of said winding of said input means and wound on a common core therewith, the other of said two coils having a reverse winding sense as that of said coil of said winding of the input means and wound on the same core and connected in series therewith, said setting means comprising leads for applying a setting pulse current having an amplitude sufficient to set said cores respectively in the states of plus and minus polarities before the application of said input information pulse current, writing bias means comprising a winding having two coils wound respectively on said cores and connected in series for applying a writing bias current pulse having an amplitude capable of producing a magnetic force approximately equal to the coercive force of said cores in reverse polarities to those caused by said setting pulse current simultaneously with the application of said input information pulse current, constant input means comprising a winding having two coils wound respectively on said cores in the same polarities as those of the coils of the winding of said input means wound on the same cores and connected in series for applying a constant current pulse having an amplitude approximately equal to an odd number which is a multiple of one half of the amplitude of said input information current pulse simultaneously with the application of said input information current pulse and for effecting a writing-in operation in conditions of residual magnetism of said cores decided by the polarity of said input pulse current and the polarity of this constant pulse current, output means comprising an output winding having two coils wound on said cores respectively in a reverse sense to the coils of the input means wound on the same cores and connected in series for deriving output current pulses, two load impedances each having two terminals to be connected to said output winding, gating means connected for passing therethrough only output current pulses other than output loop current into said load impedances, and read-out means provided at a connection point of two coils of said output winding and a connection point of said series connected two load impedances for applying a read-out current pulse capable of causing said output pulse current, a pulse supply system for comprising, generating means for generating energizing pulses to operate each of said logical elements; transformer means for supplying said pulse currents, series loop circuits each consisting of the same kind of windings of said logical elements, connections connecting said logical elements in groups, each of said groups comprising a plurality of logical elements divided into an optional number of groups among all logical elements, and auto-bias means comprising a resistor and a capacitor in parallel and connected in said loop circuit for supplying auto-bias voltage to each of said logical elements.

References Cited in the file of this patent

UNITED STATES PATENTS

| | | |
|---|---|---|
| 2,763,851 | Haynes | Sept. 18, 1956 |
| 2,846,593 | Sands | Aug. 5, 1958 |
| 2,935,737 | Muroga | May 3, 1960 |
| 2,935,738 | Richards | May 3, 1960 |